March 24, 1936.  L. GOLDHAMMER  2,034,978
PHOTOGRAPHIC CAMERA
Filed Oct. 23, 1934
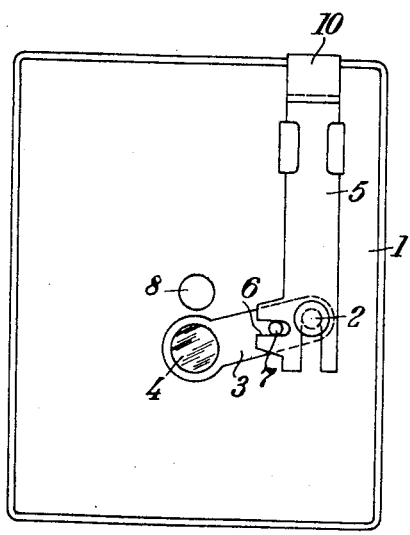
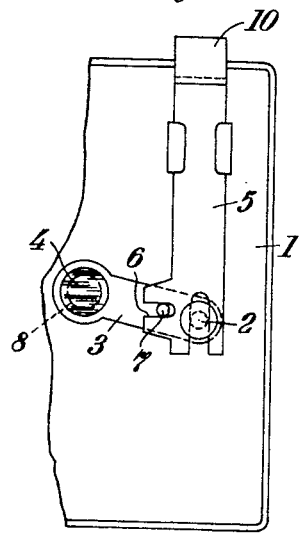
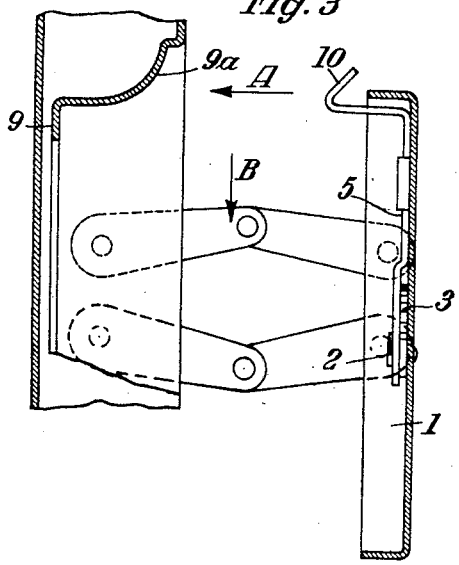
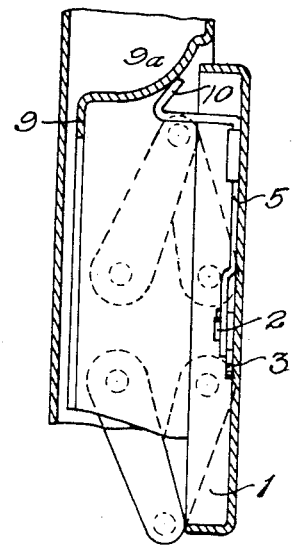
Inventor:
Leo Goldhammer,
By Attorney
Philip S. Hopkins.

Patented Mar. 24, 1936

2,034,978

UNITED STATES PATENT OFFICE 2,034,978

PHOTOGRAPHIC CAMERA

Leo Goldhammer, Munich, Germany, assignor to Agfa Ansco Corporation, Binghamton, N. Y., a corporation of New York Application October 23, 1934, Serial No. 749,633
In Germany October 25, 1933

1 Claim. (Cl. 95—39)

This invention relates to a camera in which there is a device carrying a yellow filter or a supplementary lens, and one of its objects is an arrangement by which, when the camera is closed, the yellow filter or the lens is moved from its position in front of the aperture for the objective in order to prevent false exposure of the next film should the operator forget to move the yellow filter or supplementary lens from its operative position.

The accompanying drawing illustrates the invention,

Fig. 1 being a rear elevation of the lens panel showing the position of the parts when the yellow filter is not in front of the objective aperture, Fig. 2 is a like elevation showing the yellow filter in front of the objective aperture, Fig. 3 is a sectional side elevation of the extended camera, and Fig. 4 is a sectional side elevation of the camera in closed position.

The yellow filter 4 is carried by the lever 3 pivoted at 2 to the lens panel. A slide 5 engages by means of slot 6 a pin 7 on the lever 3. To bring the yellow filter in front of the objective aperture 8 the slide 5 is drawn into the position shown in Fig. 2. When now a photograph has been taken and the camera is being closed, thereby pushing home the lens panel 1 in the direction shown by arrow A in Fig. 3 into the casing 9, the upper end of the slide 5, bent as shown at 10, engages a surface 9a of the camera casing and the slide is thereby moved downwards in the direction indicated by the arrow B in Fig. 3, so that the lever carrying the filter is returned to the inoperative position shown in Fig. 1.

What I claim is:

In a photographic camera in combination a casing, an objective panel, means for connecting said objective panel with said casing, an objective in said panel, an additional optical element, a lever carrying said optical element pivotally mounted on said panel, a slide mounted on said panel connected with said lever by means of a pin and slot connection for bringing said optical means in and out of operation with said objective, the end of said slide being bent, a surface on the camera casing co-operating with said bent end of said slide so that said optical element is brought out of operation with said objective on closing said camera.

LEO GOLDHAMMER.